Aug. 28, 1962   G. G. FAYARD   3,051,389
MACHINE CONTROL
Filed Nov. 7, 1955   13 Sheets-Sheet 1

INVENTOR
Georges G. Fayard
BY
ATTORNEYS

Aug. 28, 1962     G. G. FAYARD     3,051,389
MACHINE CONTROL

Filed Nov. 7, 1955     13 Sheets-Sheet 2

FIG_3

FIG_19

INVENTOR
Georges G. Fayard
BY

ATTORNEYS

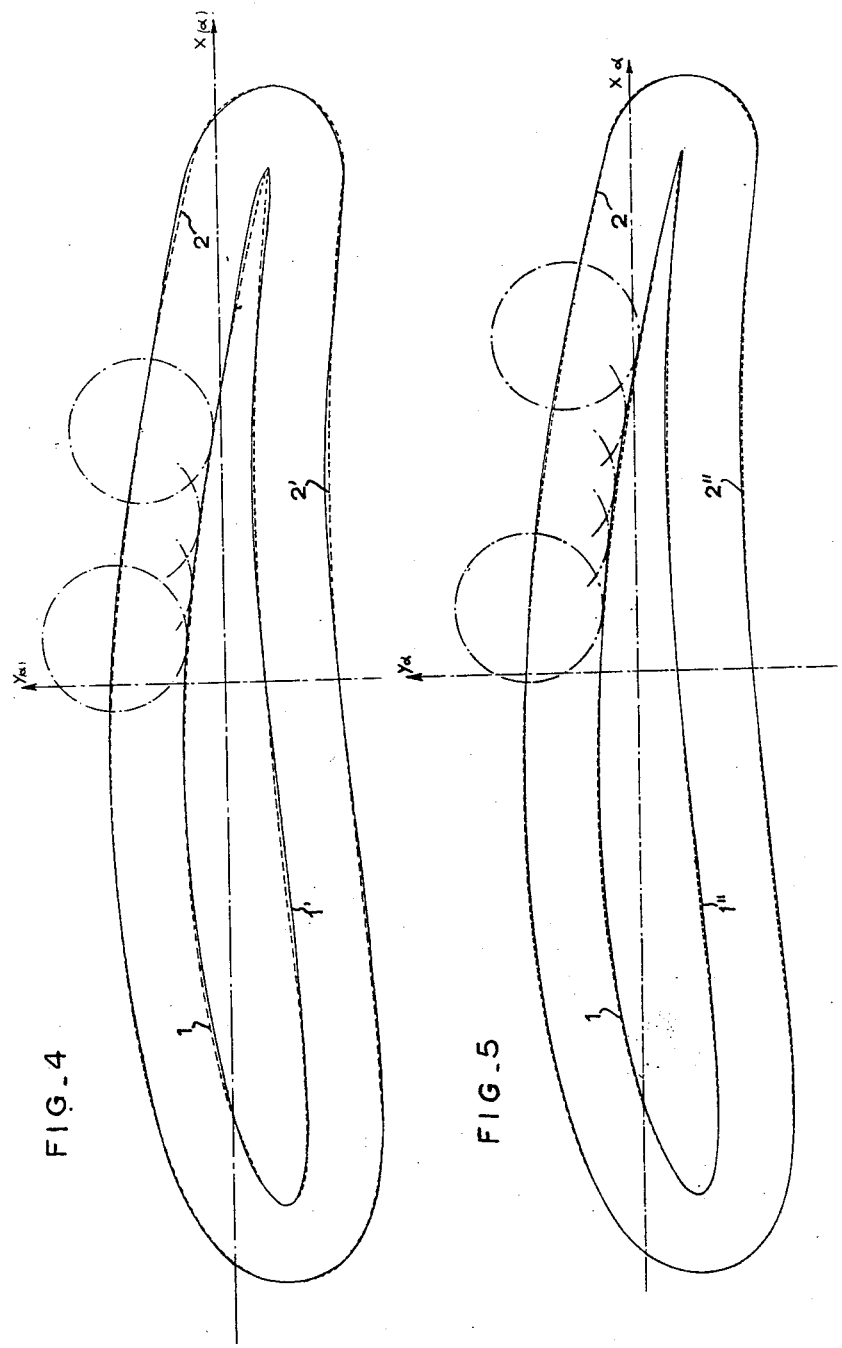

Aug. 28, 1962 G. G. FAYARD 3,051,389
MACHINE CONTROL
Filed Nov. 7, 1955 13 Sheets-Sheet 4

INVENTOR.
GEORGES G. FAYARD
BY A. A. Saffitz
ATTORNEY

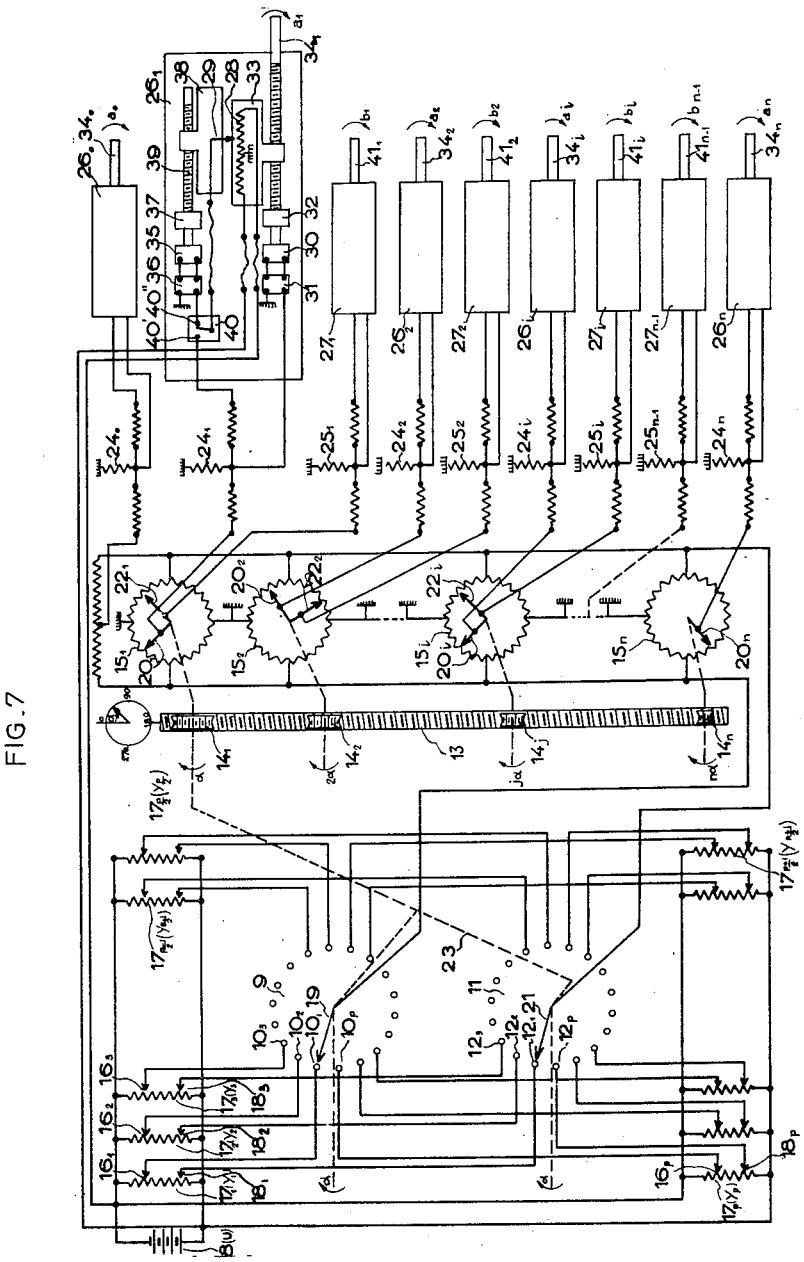

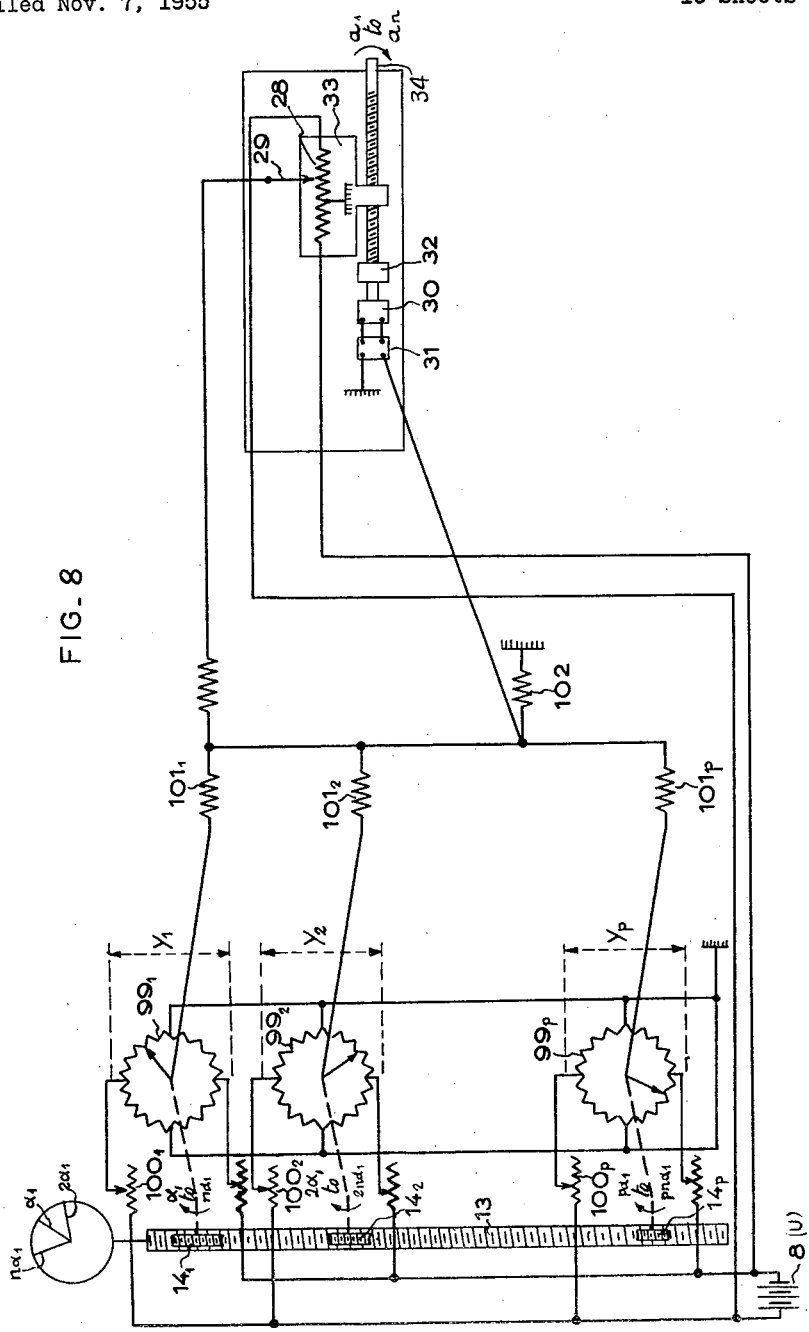

Aug. 28, 1962   G. G. FAYARD   3,051,389
MACHINE CONTROL
Filed Nov. 7, 1955   13 Sheets-Sheet 7
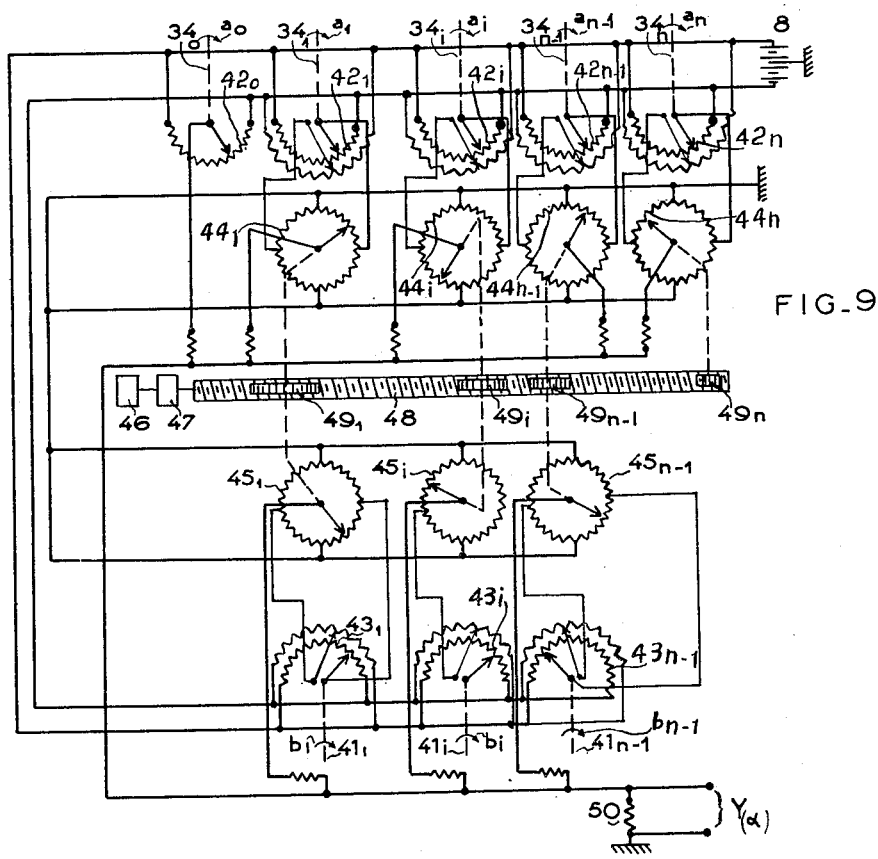
FIG_9
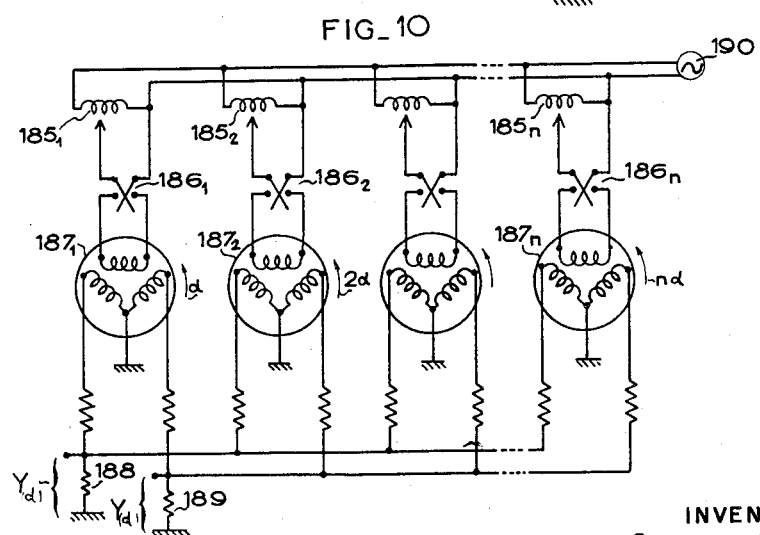
FIG_10
INVENTOR
Georges G. Fayard
BY
ATTORNEYS INVENTOR
Georges G. Fayard
BY
ATTORNEYS

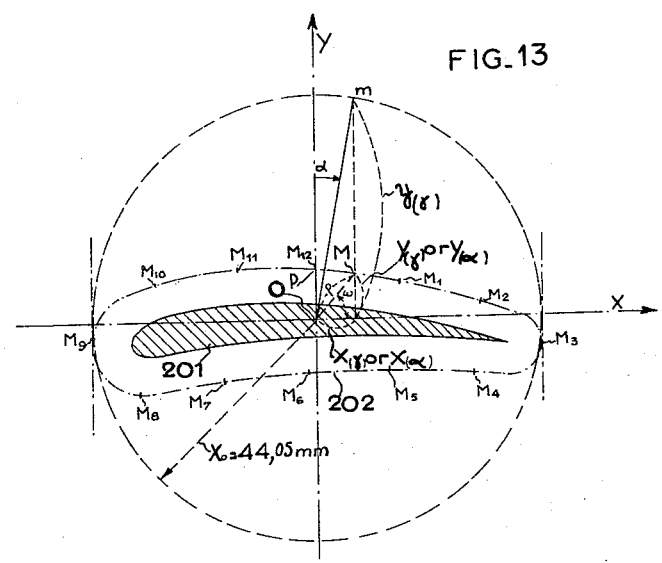
FIG_13
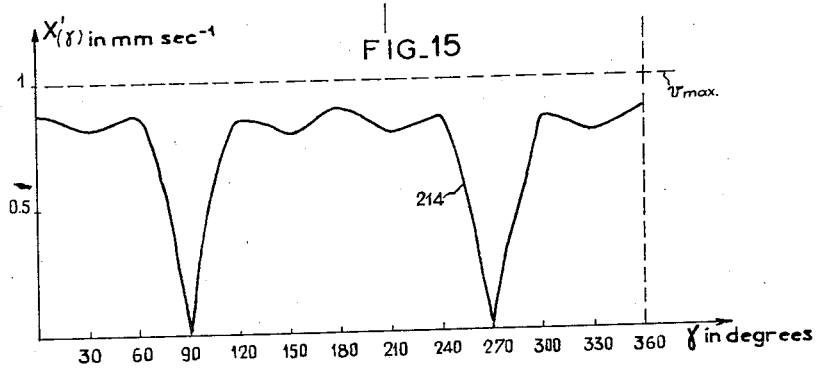
FIG_15
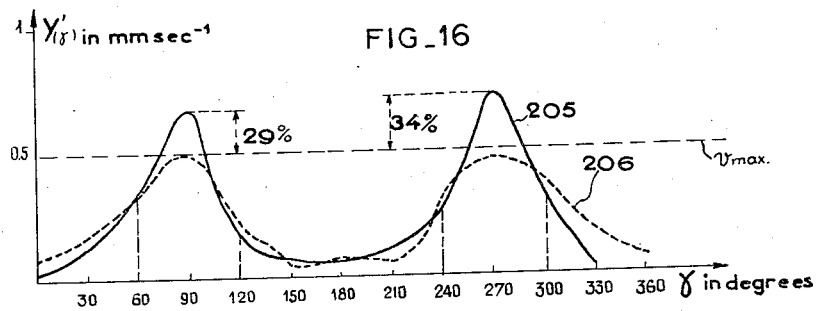
FIG_16

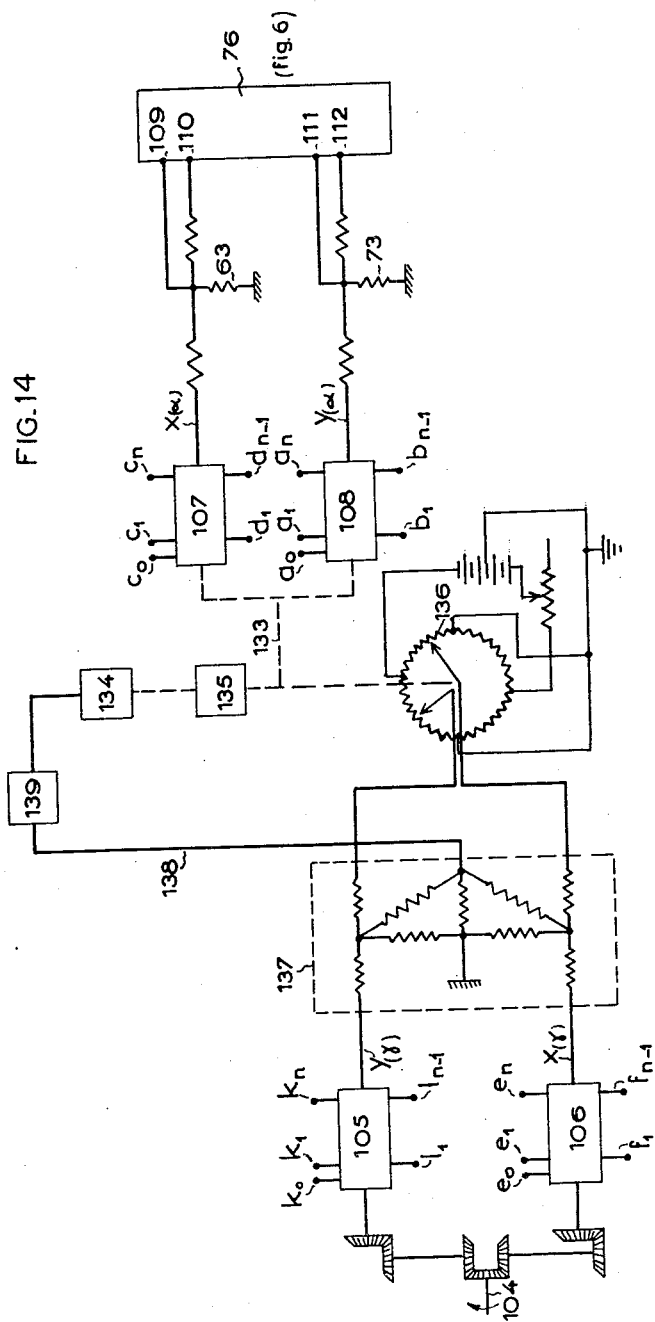

Aug. 28, 1962　　　G. G. FAYARD　　　3,051,389
MACHINE CONTROL

Filed Nov. 7, 1955　　　13 Sheets-Sheet 11

INVENTOR
Georges G. Fayard
BY

ATTORNEYS

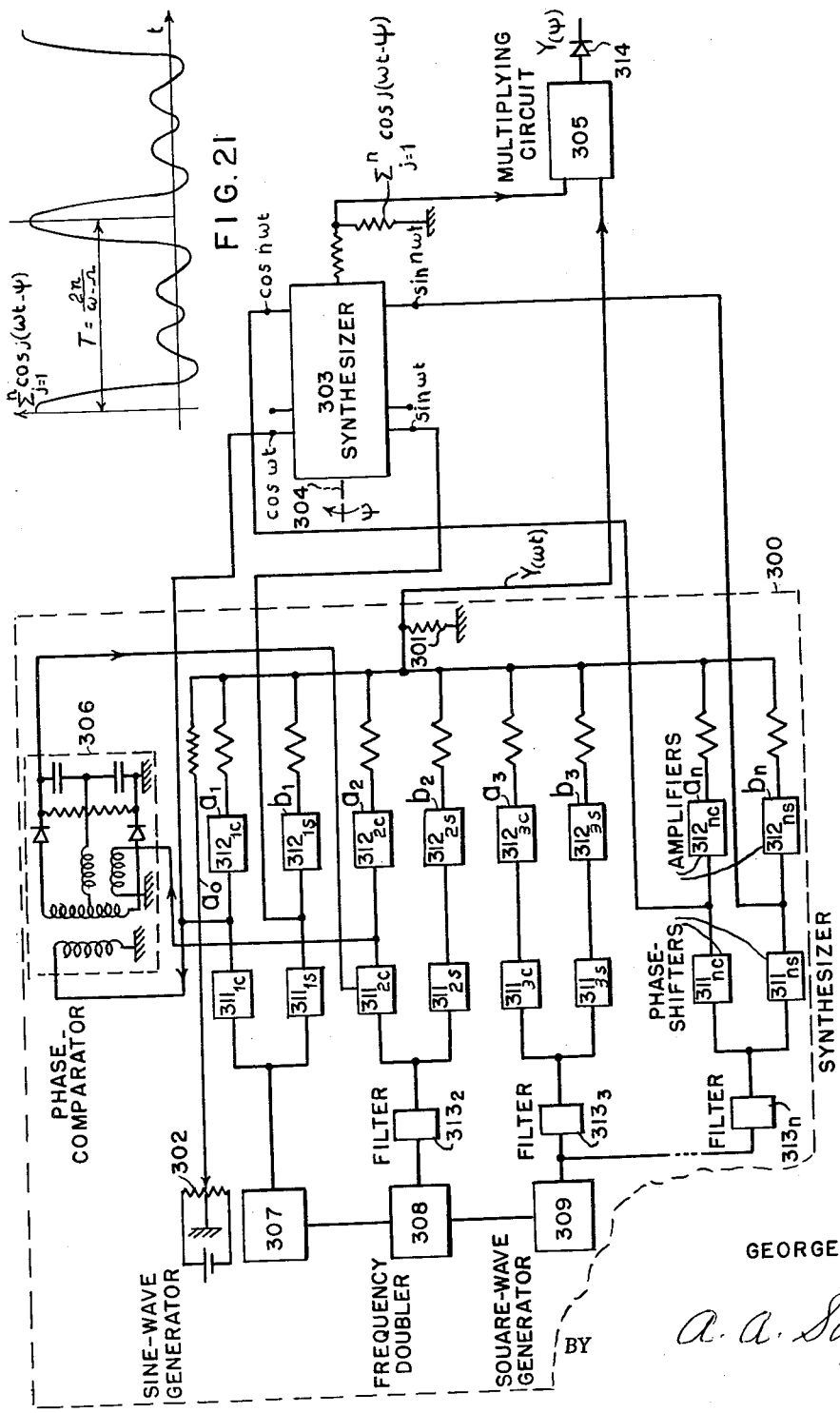

Aug. 28, 1962 G. G. FAYARD 3,051,389
MACHINE CONTROL
Filed Nov. 7, 1955 13 Sheets-Sheet 13
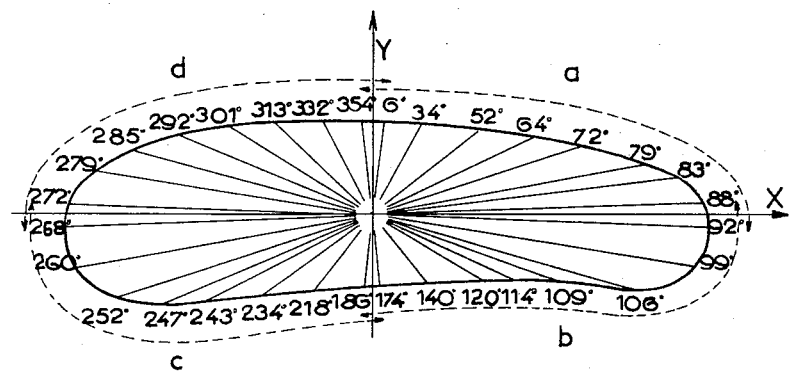
FIG_22
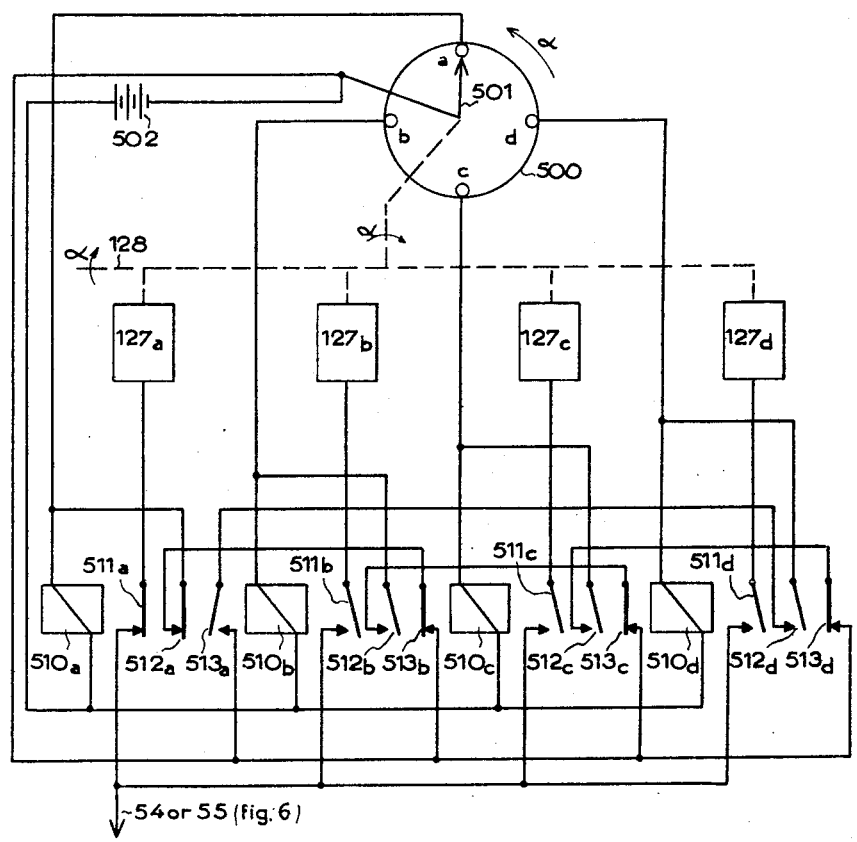
FIG_23
INVENTOR
Georges G. Fayard
BY
ATTORNEYS United States Patent Office 3,051,389
Patented Aug. 28, 1962

3,051,389
MACHINE CONTROL
Georges G. Fayard, Paris, France, assignor to Office National d'Etudes et de Recherches Aéronautiques, Chatillon-sous-Bagneux, France, a French body corporate
Filed Nov. 7, 1955, Ser. No. 545,397
Claims priority, application France Nov. 6, 1954
5 Claims. (Cl. 235—180)

The present invention relates to automatically controlled machines, for example machines for the shaping of turbine blades and the like.

The invention provides a machine of this type which dispenses with memory devices for the shapes of patterns such as cams to be followed by a feeler or magnetic or perforated tapes which record a function of space for reproduction by the machine. Instead the machine requires only that the curve to be followed by the cutting tool be known in the form of a parametric equation, or alternatively that the coordinates of a finite number of points on the curve be known.

In general terms a turbine blade or a compressor or propeller blade can be considered as being made up of a plurality of right cylinders having altitudes of any desired degree of smallness stacked together. The shape and the dimensions of the right sections of these cylinders, hereinafter to be called "profiles," generally varies from one cylinder or cylindrical element of the blade to the next. Of course it is also possible for the shape and dimensions of the successive profiles to remain constant, being simply displaced angularly with respect to each other.

The path followed by the cutter in milling a profile is a closed curve parallel to the profile, and it will hereinafter be referred to as the "parallel curve." The profile itself may for example be of convex cylindrical type of two sections.

This parallel curve can usually be defined in Cartesian or polar parametric coordinates which can be developed in the form of a Fourier series limited to a certain number of terms. A complete description of the curve is obtained by causing the parameter to vary between zero and $2\pi$. If the curve is defined by $p$ points, the number of terms $2n$ of the limited series is equal to the number $p$ of points which are given for representation of the parallel curve in question.

Prior attempts have been made to control machine tools by control units generating signals representative of the abscissa and the ordinate of a plane profile to be machined or of its parallel curve through Fourier analysis and synthesis. The parameter chosen has been, so far as I am aware, the polar angle of a point on the profile. This has the advantage of making it possible to drive by the same movement the pattern and workpiece support and the analyzer and synthesizer of the control unit. But practice has shown that, for hydrodynamic and aerodynamic profiles, the convergence of the Fourier series in terms of such a parameter is rather poor.

I have found that, by a proper choice of the angular parameter in terms of which the Cartesian or polar coordinates of the parallel curve are expressed, it is possible for a given limit of accuracy to obtain developments having good convergence and a small number of terms. The invention is based on this fact. For a given curve there are in general an infinite number of possible developments in Cartesian or polar coordinates.

The invention is equally applicable to the production of workpieces whose profiles are not closed such as the shaping of grooves or special cams. It is sufficient in such cases to join the ends of the desired profile curve by a suitable contour and to operate the command mechanism for the machine tool provided by the invention only between particular values of the parameter pertaining to the profile desired to be achieved while disabling it for other values of the parametre. Similarly the invention is applicable to the machining in part or whole of dies intended for stamping of metal sheets such as those used in automobile bodies. In such applications the invention obviates the use of the elaborate plaster models hitherto employed with a feeler for machining of dies in the automobile body industry.

The desired developments of the profile coordinates into limited Fourier series can be obtained by computation. According to the invention however the coefficients of these developments are preferably obtained automatically by the apparatus of the invention itself. For this purpose the profile data comprise not the coefficients of the limited Fourier developments but the parametric coordinates of a certain number of points on the profile curve and the parametric values which correspond thereto. The coefficients of the Fourier developments being thus determined, the curve represented in parametric coordinates by these developments passes exactly through all of the given points but cannot coincide between such points with the theoretical curve. A better degree of coincidence is obtained of course with a larger number of data points to begin with but particularly by a proper choice of the data points along the parallel curve. The profile of a blade to be reproduced always includes portions of unequal hydrodynamic or aerodynamic importance. For example it is usually desirable that the shape in the vicinity of the leading edge conform to the pattern intended therefor more closely than is necessary at the trailing edge or at certain parts of the extrados or intrados. The number of data points being constant, it is nonetheless possible to increase the precision along particular portions of the desired profile without modifying in any way the system of parametric coordinates initially chosen. It is sufficient to space the points unequally, increasing the number employed for definition of that portion of the profile which must be reproduced the most faithfully.

The apparatus of the invention comprises three principal elements:

(1) A harmonic analyzer operating by interpolation which receives as input data the numerical values of the coordinates of a number of points along the parallel curve of the desired profile and which supplies the values of the coefficients in the Fourier developments. This analyzer effects summation of products of the form:

$$\sum_{j=1}^{p} Y_j \cos j(i\alpha_1)$$

or $$\sum_{j=1}^{p} Y_j \sin j(i\alpha_1)$$

(2) A harmonic synthesizer which receives as input data the numerical values of the Fourier coefficients and which supplies in the form of voltages the instantaneous coordinates of the parallel curve. This synthesizer effects summation of the products:

$$\sum_{j=0}^{n} a_j \cos j\alpha + \sum_{j=1}^{n-1} b_j \sin j\alpha$$

(3) Servomechanisms adjusting the machine tool to position the cutter with respect to the workpiece in accordance with these voltages.

Harmonic analyzers and synthesizers are well known in the art. See for example "Harmonic Analyzer and Synthesizer" by Jules Lehmann, Electronics, November 1949, pages 106–110 and "A One-Dimensional Fourier Analog Computer" by Leonid V. Azaroff, The Review of Scientific Instruments, May 1954, pages 471–477. These devices comprise essentially sinusoidal multiplying potentiometers or synchro transformers. The parameter values in the terms to be added are arranged in arithmetic progression and can be simultaneously materialized by means of shafts coupled through gearing systems having ratios arranged in arithmetic progression to a common shaft (basic shaft) whose rotation represents the variation of the parameter itself. The sum of the products can be instantaneously obtained by adding in a common resistor the output voltages of the various potentiometers or synchros. In the case of the synthesizer the parameter varies continuously from zero to $2\pi$ and the basic shaft turns continuously. In the case of the analyzer the parameter takes on a series of discrete values which are multiples of a quantity $\alpha_1$, and the basic shaft is successively turned to positions inclined to a zero orientation by one of these discrete values.

Sinusoidal potentiometers are well known and are available in various types. It is possible for example to use those described in U.S. Patent No. 2,434,057 which comprises essentially a coil mounted flat on a rectangular insulating plate and a rotating wiper whose axis passes through the intersection of the diagonals of the plate. In synthesizers of the usual direct current and alternating current types, both coefficients and sines and cosines of the argument and of its multiples of a Fourier series are represented by current or voltage amplitudes, and the voltage representative of a term of the series is the product of the voltage representative of the coefficient and by voltage representative of the sine or cosine of the argument. In case alternating current is used, all the voltages representing the terms of the series are cophasal. The invention provides a further type of synthesizer in which the coefficients of the Fourier series are represented by amplitudes of alternating currents and the argument and its multiples are represented by the phase and the multiples thereof. Consequently the frequencies of the voltages representative of the successive terms of the series are multiples of each other. As it is convenient to give the frequency of the fundamental term the frequency of the mains, i.e. 60 c./s., the cycle of this term which is the period of the series is too small for allowing the machine tool driving servomechanisms to operate. The invention provides means for deriving from the synthesizer sampling pulses having a recurrence frequency slightly differing from the series period and thus allowing the function representative of a coordinate to be stroboscopically sampled.

The invention further provides control apparatus of the type described which makes it possible for the machine tool to operate with a substantially constant output of chips selected to be suitable to the cutting tool and to the workpiece.

The invention also provides control apparatus which makes it possible for the machine to operate without vibration.

For the purpose of achieving a constant rate of cut and smooth operation the cutting speed and the rate of advance of the tool with respect to the work are controlled at each point of the motion of the cutting tool with respect to the remainder of the machine to optimum values which result in efficient operation of the machine.

According to the invention, the curve parallel to the profile is defined by points equidistant therealong, i.e. such that the curvilinear abscissa separating two successive points is constant, and the coordinates of these points are expressed as limited Fourier series as functions of a first angular parameter proportional to the curvilinear abscissa and to time. In these conditions, the movement of the cutting tool along the parallel curve would be uniform if the servomechanism operating on the traverse elements between the cutting tool and the remainder of the machine were governed by command signals in the form of voltages proportional to the coordinates thus defined. In general however for various reasons, in particular the convergence of the series, the coordinates are developed in the form of limited Fourier series of a and the first one, which varies linearly with time. The variation of the second angular parameter as a function of time is then determined by a coupling which takes into account the relation between the second parameter and the first one, which varies linearly with time. The servomechanism or other apparatus which then operates to position the cutting tool in response to voltages proportional to coordinates expressed as functions of the second angular parameter thereupon operates so that the motion of the cutting tool along the parallel curve is uniform.

It should however be noted that since in general the curvature of the profile itself is not constant, constant speed of advance of the cutting tool along its trajectory does not correspond to a constant speed of advance of the tool along the profile at the cutting point. Nonetheless the latter speed of advance does not differ greatly from the rate of advance of the cutting tool along its trajectory (e.g. of the axis of a rotating cutter) except perhaps in the vicinity of the leading and trailing edges of a blade. Since in the final analysis it is more important to obtain a constant rate of cut in the sense of a constant rate of flow of chips than to have a constant rate of advance of the tool along the profile, the outline of the raw workpiece as it comes from the foundry is so established that the thickness of material to be removed is greater in the vicinity of the leading and trailing edges of the blade than elsewhere, i.e. greater at those places where the speed of advance of the point of contact between the cutting tool and the workpiece is substantially lower than the motion of the cutting tool center along its trajectory. The invention further makes it possible to determine, on the curve parallel to the desired profile, zones within each of which the speed of motion of the cutting tool (e.g. motion of the axis of a rotating cutter with respect to the workpiece) is constant, this speed changing from zone to zone and the magnitude thereof in each zone being determined by the speed of response of the servomechanisms which position the cutting tool with respect to the workpiece.

The invention further effects determination along the parallel curve of zones within each of which the cutting speed is determined to avoid vibration of the workpiece.

The invention will now be described in detail by reference to the accompanying drawings in which:

FIGS. 1 to 3 are diagrams of right sections or profiles of different types of turbine blades, showing in conjunction therewith the curves parallel to these profiles traced out by the axis of the cutting tool, indicating the geometrical significance of the angular parameter as a function of which the profile coordinates are developed.

FIGS. 4 and 5 are diagrams for comparison of a curve parallel to the theoretically desired profile section of a blade with the curve obtained by means of the apparatus of the invention, with one degree of accuracy in FIG. 4 and another degree of accuracy in FIG. 5.

FIG. 7 is a schematic diagram of the interpolation harmonic analyzer.

FIG. 8 is a diagram of an alternate form of harmonic analyzer according to the invention.

FIG. 9 is a diagram of a first type of harmonic synthesizer.

FIG. 10 is a diagram of an alternate form of harmonic synthesizer.

FIG. 13 is a diagram of a blade profile and of the curve parallel thereto useful in explaining the operation of the apparatus of the invention when the speed of advance of the cutting tool is to be constant.

FIG. 14 is a schematic diagram, partly in block form, of the apparatus of the invention as arranged for constant speed of advance of the cutting tool.

FIGS. 15 and 16 are curves representing the derivatives with respect to time of the Cartesian coordinates as a function of the angular parameter.

FIG. 19 is a schematic diagram, partly in block form, of apparatus according to the invention for control of the speed of rotation of the cutting tool by means of a harmonic synthesizer.

FIG. 20 is a block diagram of a third type of harmonic synthesizer associated with sampling pulse generating means and FIG. 21 shows the sampling pulse waveform.

FIG. 22 is a diagram useful in explaining the apparatus of FIG. 23.

FIG. 23 is a block diagram useful in explaining the operation of the apparatus of the invention in a machining operation involving fractional passes or cuts and in which the harmonic analysis and synthesis of the desired parallel curve are made for successive sectors.

Figure 1:
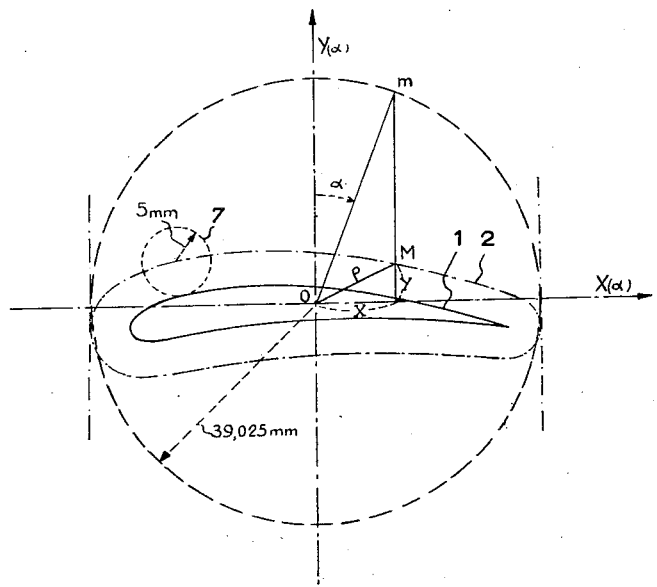
Figure 2:
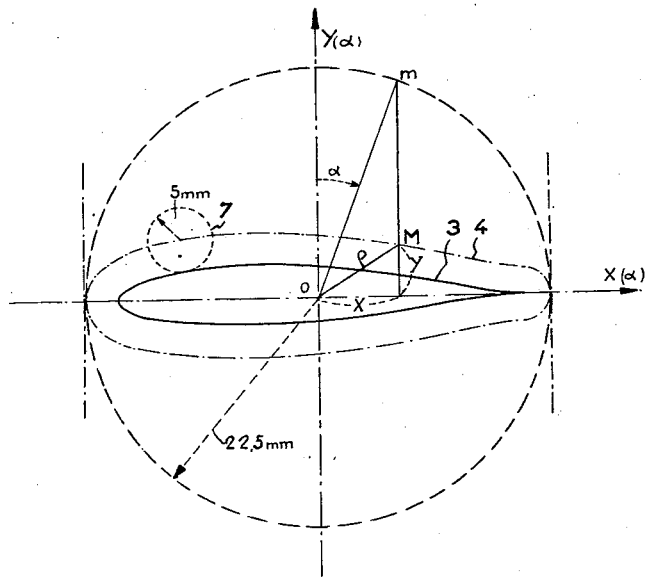

FIGS. 1, 2 and 3 illustrate at reference characters 1, 3 and 5 three right sections of blades and, at reference characters 2, 4 and 6, respectively, the curves parallel to these profiles traced out by the axis of a rotating cutter 7. This cutter may for purposes of a concrete example only be assumed to have a diameter of 5 mm. The profile 1 of FIG. 1 is a Joukowski profile, that of FIG. 2 is of the type identified as No. 64–1–212 of the National Advisory Committee for Aeronautics and the profile of FIG. 3 is one comprising two circular arcs respectively of 313 and of 46.4 cm.

One may start from the statement:

$$X = X_0 \sin \alpha$$

In this expression $X_0$ is the half distance between two tangents to the parallel curve 2, 4 or 6, these tangents being parallel to each other and containing between them the complete parallel curve as indicated in FIGS. 1–3. The angle $\alpha$ then represents in these figures the polar angle of a point $m$ on the circle tangent to the two parallel tangents just mentioned, the center of this circle being at the origin of coordinates. The point $m$ has the same abscissa as the running point $M$ on the parallel curve. Under these conditions, the developments in a Fourier series limited to six terms ($n=6$) for the ordinate of these same curves are:

With respect to the curve 2 of FIG. 1 ($X_0 = 39.025$ mm.)

$Y = -20.26$  $+86.16 \cos \alpha$  $-0.34 \sin \alpha$
$+18.44 \cos 2\alpha$  $-9.13 \sin 2\alpha$
$-12.58 \cos 3\alpha$  $+0.90 \sin 3\alpha$
$+2.50 \cos 4\alpha$  $-2.69 \sin 4\alpha$
$+3.81 \cos 5\alpha$  $+0.47 \sin 5\alpha$
$-1.24 \cos 6\alpha$ For the case of curve 4 of FIG. 2 ($X_0 = 22.50$ mm.)

$Y = +5.48$  $+107.26 \cos \alpha$  $-2.97 \sin \alpha$
$+5.85 \cos 2\alpha$  $-14.66 \sin 2\alpha$
$-7.13 \cos 3\alpha$  $+0.09 \sin 3\alpha$
$-0.09 \cos 4\alpha$  $-3.25 \sin 4\alpha$
$+6.44 \cos 5\alpha$  $+0.21 \sin 5\alpha$
$-0.28 \cos 6\alpha$ In the case of the curve 6 of FIG. 3, which is symmetric with respect to the axis OY of FIG. 3 ($X_0 = 55$ mm.)

$Y = +7.02$  $+73.73 \cos \alpha$
$+10.15 \cos 2\alpha$
$-8.73 \cos 3\alpha$
$+2.53 \cos 4\alpha$
$+2.32 \cos 5\alpha$
$-0.80 \cos 6\alpha$ The development of the radius vector $\rho$ of the curve 2 as a function of the same parameter $\alpha$ is $\rho = +262$  $-4.16 \cos \alpha$  $-1.89 \sin \alpha$
$-148.20 \cos 2\alpha$  $+0.76 \sin 2\alpha$
$-3.31 \cos 3\alpha$  $-2.57 \sin 3\alpha$
$-24.40 \cos 4\alpha$
$+0.22 \cos 5\alpha$  $-0.82 \sin 5\alpha$
$-7.30 \cos 6\alpha$ More generally it is possible to write $$\left.\begin{aligned} X(\alpha) &= \sum_{j=0}^{n} c_j \cos j\alpha + \sum_{j=1}^{n-1} d_j \sin j\alpha \\ Y(\alpha) &= \sum_{j=0}^{n-1} a_j \cos j\alpha + \sum_{j=1}^{n-1} b_j \sin j\alpha \end{aligned}\right\} \quad (1)$$

In the foregoing the coefficients in the limited expansions have been calculated. They may however be obtained automatically by means of the apparatus of the invention from input data for the coordinates of $p$ points ($p = 2n$). The interpolation harmonic analyzer solves (for the case of the ordinate) the following equations:

$Y_1 = a_0 + a_1 \cos \alpha_1 + \ldots + a_n \cos n\alpha_1$
$\qquad + b_1 \sin \alpha_1 + \ldots + b_{n-1} \sin (n-1)\alpha_1$
$Y_j = a_0 + a_1 \cos \alpha_j + \ldots + a_n \cos n\alpha_j$
$\qquad + b_1 \sin \alpha_j + \ldots + b_{n-1} \sin (n-1)\alpha_j$
$Y_p = a_0 + a_1 \cos \alpha_p + \ldots + a_n \cos n\alpha_p$
$\qquad + b_1 \sin \alpha_p + \ldots + b_{n-1} \sin (n-1)\alpha_p$ in which $Y_1$, $Y_j$ and $Y_p$ are the values of the ordinates of known points on the desired parallel curve corresponding to values $\alpha_1$, $\alpha_j$ and $\alpha_p$ of the parameter. The $2n$ unknowns are the coefficients $a_0$ to $a_n$ and $b_1$ to $b_{n-1}$. When the angular intervals between the parameter values of the known parallel curve points are equal or in other words when the known points correspond to equally spaced values of the angular parameter, the coefficients are given by the relations:

$$a_i = \frac{2}{p} \sum_{j=1}^{p} Y_j \cos i\alpha_j$$

$$b_i = \frac{2}{p} \sum_{j=1}^{p} Y_j \sin i\alpha_j$$

$$a_0 = \frac{1}{p} \sum_{j=1}^{p} Y_j$$

Since as a result of the equal spacing of the parameter values $\alpha_j = j\alpha_1$, the preceding relations assume the form:

$$a_i = \frac{2}{p} \sum_{j=1}^{p} Y_j \cos j(i\alpha_1) \qquad (2)$$

$$b_i = \frac{2}{p} \sum_{j=1}^{p} Y_j \sin j(i\alpha_1) \qquad (3)$$

$$a_0 = \frac{1}{p}\sum_{j=1}^{p} Y_j \qquad (2')$$

For example FIGS. 4 and 5 show in dashed lines the theoretical or desired profile 1 and the corresponding theoretical parallel curve 2, and in full lines the interpolated profiles 1' and 1" and the corresponding interpolated parallel curves 2' and 2" for the case where the parametric equations of the parallel curves are limited respectively to five and to eight terms. It will be observed that even with the parametric equations limited to five terms the coincidence between the interpolated parallel curve 2' and the theoretical curve 2 is very good and that it is nearly perfect between the interpolated curve 2" and the theoretical curve 2 when the parametric equations are limited to eight terms.

Figure 6:
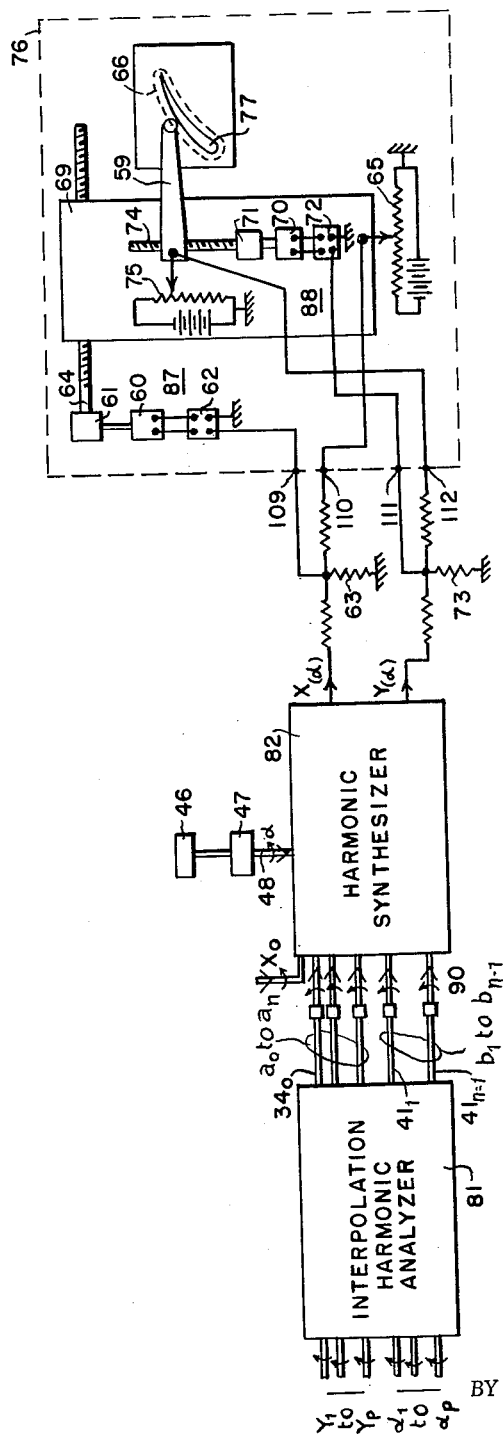
FIG. 6 is a block diagram of the apparatus of the invention.

Referring to FIG. 6 the invention comprises an interpolation harmonic analyzer 81 which, from data constituted by ordinates of sample points on the curve parallel to the profile and of the parameters corresponding to these ordinates, develops the values of the coefficients in a limited Fourier development of the ordinate, these coefficients $a_0$ to $a_n$ and $b_n$ to $b_{n-1}$ taking for example the form of rotations of shafts $34_0$ to $34_n$ and $41_1$ to $41_{n-1}$.

The rotations of these shafts thus constitute input data to the harmonic synthesizer 82, which receives as supplementary input data a variable angle $\alpha$ in the form of a rotation of the shaft 48 representing the output of a speed reducer 47 driven by a motor 46. The synthesizer also receives as input data the quantity $X_0$, again in the form of a shaft rotation. Of course, if the abscissa X of the running point M on the curve parallel to the profile, instead of being a simple sinusoidal function is like the ordinate a limited Fourier series, the terms for this series would be obtained by means of a second interpolation harmonic analyzer identical to the analyzer 81.

Output shafts $34_0$ to $34_n$ and $41_1$ to $41_{n-1}$ from interpolation harmonic analyzer 81 and input shafts of the same reference numerals for harmonic synthesizer 82 are connected through clutches 90 in order to allow independent reset of said shafts.

The synthesizer 82 develops the values of X and Y as functions of $\alpha$, for example in the form of voltages. These voltages are applied respectively to abscissa and ordinate servomechanisms 87 and 88 which control screws 64 and 74 for positioning the cutting tool with respect to the workpiece in orthogonal directions of a horizontal plane.

The carriage 59 which supports the cutting tool is subjected to two orthogonal motions with respect to the workpiece 77. The first motion is derived from a motor 60 which is coupled to a speed reducer 61 and then to carriage 69 via lead screw 64. The motor 60 is energized via amplifier 62, by an error voltage which appears across resistor 63 and which is equal to the difference between the voltage representative of $X(\alpha)$ and the output voltage from potentiometer 65 whose winding is fixed to the frame of the machine tool 76 and whose slider is fixed to the carriage 69.

The second motion is applied directly to the carriage 59 which supports the cutter itself. This motion is developed by motor 70 which drives lead screw 74 through a speed reducer 71. The carriage 59 is of course coupled to the lead screw by means of a nut.

Motor 70 is energized via amplifier 72 from an error voltage which appears across resistor 73 and which is equal to the difference between the voltage representative of $Y(\alpha)$ and the output voltage of potentiometer 75, whose winding is fixed to the main carriage 69 and whose slider is fixed to the secondary carriage 59 which supports the cutting tool itself.

For simplicity, in some of the succeeding figures of the drawing, the machine tool with its servomechanisms will be represented simply by means of a rectangle 76 having four electrical terminals 109–112, corresponding to those shown in FIG. 6.

The interpolation harmonic analyzer 81 is shown in FIG. 7. It includes at least $p$ linear potentiometers numbered $17_1$ to $17_p$, energized from a D.C. source 8 of voltage U. On the potentiometer $17_1$ there is set up the value of the ordinate $Y_1$ corresponding to the parameter value $\alpha_1$. Similarly potentiometer $17_p$ is set to the value of the ordinate $Y_p$ corresponding to the parameter value $\alpha_p$.

The wipers $16_1$ and $18_1$ of potentiometer $17_1$ are respectively connected to terminals $10_1$ and $12_1$ of rotary switches 9 and 11. These terminals are inclined to the rest position of the switches at an angle $\alpha_1$ which is equal to the value of the parameter $\alpha$ for which the ordinate is $Y_1$. Similarly the wipers $16_p$ and $18_p$ of potentiometer $17_p$ are respectively connected to terminals $10_p$ and $12_p$ of switches 9 and 11, and these terminals are oriented with respect to the rest position of the switches at an angle $\alpha_p$ which is equal to the value of the parameter for which the ordinate is $Y_p$. As previously stated, the values $\alpha_1$ to $\alpha_p$ of the parameter are equidistant, i.e. $\alpha_j = j\alpha_1 = j2\pi/p$ and the data are the values of the ordinate Y for these linearly spaced values of the parameter $\alpha$. Consequently the terminals on switches 9 and 11 are equiangularly spaced. The arms 19 and 21 of switches 9 and 11 are coupled together and are connected to the voltage supply terminals of $n$ sine and cosine multiplying potentiometers $15_1$ to $15_n$. The number $n$ of sine potentiometers is equal to the number $p$ of linear potentiometers. The cosine wipers $20_1$ to $20_n$ of the sinusoidal potentiometers and the perpendicular sine wipers $22_1$ to $22_{n-1}$ (potentiometer $15_n$ has no sine wiper) are mechanically coupled by a tangent screw 13 which engages with the worm wheels $14_1$ to $14_n$. The diameters of these worm wheels are such that when the wipers of potentiometer $15_1$ rotate through an angle $\alpha$ the wipers of potentiometer $15_2$ will rotate through an angle $2\alpha$ and so on with the wipers of potentiometer $15_n$ rotating through an angle $n\alpha$. Lastly the arms 19 and 21 of switches 9 and 11 are connected via a coupling 23 to the worm wheel $14_1$ and hence rotate through the same angle as wipers $20_1$ and $22_1$.

Shaft 13 may be turned by hand or some similar means and is designed to stop at predetermined angles $\alpha_1$, $2\alpha, \ldots n\alpha_1$.

When the tangent screw 13 is inclined at the angle $\alpha_1$ to its rest position potentiometers $15_1$ to $15_n$ are energized with a voltage representative of $Y_1$ and their cosine wipers supply to the terminals of load resistors $24_1$ to $24_n$ voltages $$Y_1 \cos \alpha_1$$
$$Y_1 \cos 2\alpha_1$$
$$\ldots \ldots$$
$$Y_1 \cos n\alpha_1$$

and their sine wipers supply to the terminals of load resistors $25_1$ to $25_{n-1}$, voltages $$Y_1 \sin \alpha_1$$
$$Y_1 \sin 2\alpha_1$$
$$\ldots \ldots \ldots$$
$$Y_1 \sin (n-1)\alpha_1$$

When the tangent screw is inclined to its rest position at an angle $j\alpha_1$, the potentiometers $15_1$ to $15_n$ are energized with a voltage representative of $Y_j$ and apply to the load resistors $24_1$ to $24_n$ voltages $$Y_j \cos j\alpha_1$$
$$Y_j \cos 2j\alpha_1$$
$$\ldots \ldots$$
$$Y_j \cos nj\alpha_1$$

and, to the load resistors $25_1$ to $25_{n-1}$, voltages $$Y_j \sin j\alpha_1$$
$$Y_j \sin 2j\alpha_1$$
$$\ldots\ldots\ldots\ldots$$
$$Y_j \sin (n-1)j\alpha_1$$

Servomechanisms $26_0$ to $26_n$ and $27_1$ to $27_{n-1}$ have their voltage input terminals connected respectively to the resistors $24_0$ to $24_n$ and $25_1$ to $25_{n-1}$.

Each servomechanism includes a reference potentiometer whose winding 28 is energized from source 8 and each potentiometer also includes a wiper 29. For each servomechanism the winding 28 is mounted on a support 33 coupled to lead screw $34_1$. This screw is driven, through a reducing mechanism 32, by a motor 30 which is energized via an amplifier 31 by means of a voltage equal to the difference between the output voltage available at wiper $20_1$ and the output voltage of potentiometer 28.

The wiper 29 is mounted on a support 38 which is coupled to lead screw 39. This screw is driven, via a speed reducer 37, by a motor 35 which is energized, via amplifier 36, by the output voltage of potentiometer 28.

A switch 40 makes it possible to apply the output voltage of potentiometer 28 (i.e. that taken at tap 29) to the terminals of resistor $24_1$ or to the input of amplifier 36, these two positions for switch 40 being identified as 40' and 40'', respectively.

With now the tangent screw 13 inclined to its rest position at an angle $\alpha_1$ and with switch 40 in position 40', the screw 34 rotates through an angle proportional to $Y_1 \cos \alpha_1$. The switch 40 is then shifted to position 40'' and the screw 39 turns through an angle equal to $-Y_1 \cos \alpha_1$. The potentiometer 28—29 is then restored to its rest position. The tangent screw 13 is then caused to shift to a position inclined to its rest position at an angle $2\alpha_1$, and screw 34 rotates through an angle proportional to $Y_2 \cos 2\alpha_1$. When the switches 9 and 11 have scanned all of their terminals 10 and 12, the shaft $34_1$ gives an indication proportional to $$\frac{2}{p}\sum_{j=1}^{p} Y_j \cos j\alpha_1$$

i.e. proportional to $a_1$ in accordance with Equation 1. In the same fashion it may be seen that the servomechanism having its input terminals connected to resistor $25_1$ produces on its shaft $41_1$ an indication proportional to $b_1$. In general terms, the servo connected to resistance $24_i$ gives on its shaft $34_i$ an indication proportional to $a_i$, and the servo connected to resistor $25_i$ gives on its shaft $41_i$ an indication proportional to $b_i$.

The coefficients $a_0$ to $a_n$ and $b_1$ to $b_{n-1}$ of the Fourier development of the ordinate Y limited to the order $n$ are thus available on shafts $34_0$ to $34_n$ and $41_1$ to $41_{n-1}$.

FIG. 8 represents a modification of the analyzer of FIG. 7. In this figure $99_1 \ldots 99_p$ represent sinusoidal potentiometers of a number $p$ equal to the number $p$ of of points whose data define the curve. This number is at least equal to twice the number of terms in the Fourier development employed to represent the curve to the desired degree of accuracy. $100_1 \ldots 100_p$ are control rheostats which make it possible to apply to these potentiometers supply voltages proportional to $Y_1 \ldots Y_p$. The wipers of the potentiometers are positioned by operation of a shaft 13 which drives pinions $14_1 \ldots 14_p$ having relative drive ratios of one, two $\ldots p$. $101_1 \ldots 101_p$ are mixing resistors, and 102 is a common adding resistor.

The voltage appearing at the terminals of the resistor 102 whose value is $$\sum_{j=1}^{p} Y_j \cos j(i\alpha_1)$$

(i.e. which is proportional to $a_i$ when the shaft 13 occupies the position $i\alpha_1$) is applied to a servo-mechanism including amplifier 31, servomotor 30, speed reducer 32 and lead screw 34 which drives a reference potentiometer 28—29. The potentiometer winding 28 is mounted on a support 33 coupled to screw 34 while the wiper 29 is stationary and is connected to resistor 102. It may be seen here that the addition of the various products which make up a given coefficient in the Fourier series is no longer made effective in a succession of operations but takes place instead in the course of a single operation, the same shaft 34 thus delivering the coefficients $a_1$–$a_n$ as the shaft 13 successively takes up the discrete angular positions $\alpha_1$ to $n\alpha_1$. Of course a second group of $p$ sinusoidal potentiometers would on another single shaft develop the coefficients $b_1$ to $b_{n-1}$.

FIG. 9 illustrates diagrammatically a first synthesizer. It comprises $(n+1)$ linear potentiometers $42_0 \ldots 42_n$ having parallel double windings and parallel double wipers whose wipers are coupled to shafts $34_0 \ldots 34_n$ of the interpolation harmonic analyzer and an additional set of $n-1$ linear potentiometers $43_1 \ldots 43_{n-1}$ having also parallel double windings and parallel double wipers whose wipers are driven by shafts $41_1 \ldots 41_{n-1}$. All of these potentiometers are energized from the D.C. source 8 whose voltage is designated U. The terminals of the two windings on the same side of the potentiometers are connected to opposite polarity terminals of source 8 so that potentials symmetrical with respect to ground will appear at the two wipers.

The output voltages from potentiometers $42_1 \ldots 42_n$ energize the sinusoidal potentiometers $44_1 \ldots 44_n$. Likewise the output voltages of potentiometers $43_1 \ldots 43_{n-1}$ energize the sinusoidal potentiometers $45_1 \ldots 45_{n-1}$.

The wipers of the sine potentiometers are driven by a motor 46 through a reducer 47, a tangent screw 48 and worm wheels $49_1$ to $49_n$ having diameters such that when the wipers of sine potentiometers $44_1$ and $45_1$ rotate through an angle $\alpha$, those of potentiometers $44_i$ and $45_i$ rotate through $i\alpha$, the wiper of potentiometer $44_n$ rotating through $n\alpha$.

The output voltages of the sine potentiometers which are representative of the terms $a_i \cos i\alpha$ and $b_i \sin i\alpha$ are applied to resistor 50 at the same time as the output voltage of potentiometer $44_0$ which is representative of $a_0$. Thus one obtains at the terminals of resistor 50 a voltage representative of $Y(\alpha)$.

A second type of synthesizer is diagrammatically illustrated in FIG. 10. It includes as set forth in the publication of Azaroff previously cited $n$ autotransformers $185_1$ to $185_n$ which are energized by an A.C. source 190 and which in turn energize the rotors of resolvers $187_1$ to $187_n$ via $n$ phase selector switches $186_1$ to $186_n$. Let it be supposed now that the Fourier developments are known in amplitude and phase rather than in terms of the coefficients of the sine and cosine terms. Each autotransformer is positioned with respect to a zero position at an elongation proportional to the amplitude of the term in this series which it represents. Each rotor is positioned with respect to a zero direction at an angle equal to the phase of the term represented. The rotors are driven by a shaft rotating according to the angle $\alpha$ and by gearing or coupling systems not shown such that when the first rotor turns at one speed the second turns at double speed and so on.

The first stator windings of the various resolvers are connected in parallel to the terminals of a resistor 188 at whose terminals the voltage $Y(\alpha)$ appears. Likewise the second stator windings of the resolvers are connected in parallel to the terminals of a resistor 189, at which terminals likewise there appears the voltage $Y(\alpha)$ but with a quadrature phase relation with respect to the voltage available across resistor 188.

Figure 12:
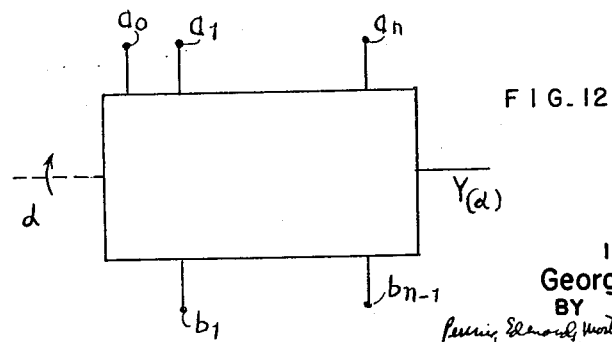
FIG. 12 is a functional diagram of the harmonic synthesizer.

Synthesizers of the first and second types respectively illustrated in FIGS. 9 and 10 will hereinafter be diagrammatically indicated as shown in FIG. 12 in the form of a block including at the top thereof terminals to which are applied voltages $a_0, a_1 \ldots a_n$ representing the cosine terms, lower terminals to which are applied the voltages $b_1 \ldots b_{n-1}$ representative of the sine terms, an input shaft rotating according to $\alpha$ and an output terminal on which appears the voltage $Y(\alpha)$ or, more generally, the quantity represented by the Fourier series under consideration.

A third type of synthesizer 300 is illustrated in FIG. 20. This synthesizer includes a plurality of devices to generate harmonic A.C. voltages whose amplitudes are proportional to the coefficients of the Fourier terms, together with means for adding these voltages. Otherwise stated, each term of the Fourier developments which, in the synthesizer of the first and second types hitherto described was represented by a D.C. or A.C. voltage of amplitude proportional both to the value of that term and to the sine or cosine of a variable angle is in the third type of synthesizer represented by an A.C. current of amplitude only proportional to the value of the coefficient. The angular parameter $\alpha$ in terms of which the coordinates are developed in limited Fourier series is here represented by the phase of a reference A.C. current, i.e. the product $\omega t$ of the angular frequency $\omega$ and the time $t$.

Since the value of the angular frequency of the A.C. current which represents the fundamental in the Fourier developments is too great to permit control, by means of the voltages delivered by the synthesizer, of the servomechanisms which drive the machine tool elements for positioning the cutting tool with respect to the workpiece, a special device is provided which extends for a longer time the cycle of the voltages which represent the coordinates. If $X(\omega t)$ and $Y(\omega t)$ are the Cartesian coordinates of a point on the parallel curve and having a period $2\pi/\omega$ of the order of $\frac{1}{60}$ of a second at most, the device for extending the duration of the cycle transforms these coordinates into $X(\psi)$ and $Y(\psi)$ where $\psi$ is an angular parameter variable with time and having the desired period for example of several minutes for control of the servomechanisms.

In FIG. 20 307 designates a generator of sinusoidal signals having for example a frequency of the order of 1000 c.p.s. The generator 307 energizes a frequency doubler 308 and a rectangular wave generator 309.

The output of the frequency doubler leads to a filter $313_2$ which passes only the frequency 2000 c.p.s. The output of the rectangular wave generator 309 leads to a series of parallel connected filters $313_3$ to $313_n$ which pass respectively the frequencies 3000 c.p.s., 4000 c.p.s. .... 1000$n$ c.p.s.

Each filter is followed by two phase shifters, identified for the filter $313_n$ at $311_{nc}$ and $311_{ns}$ which provide quadrature outputs and which consequently produce signals representative of sine and cosine terms.

The phase shifter $311_{nc}$ is followed by an amplifier $312_{nc}$ having a gain proportional to $a_n$, and the phase shifter $311_{ns}$ is followed by an amplifier $312_{ns}$ having a gain proportional to $b_n$.

All of the amplifier outputs are added in a load resistor 301, together with a voltage proportional to $a_0$ taken from a linear potentiometer 302. Across resistor 301 there appears the voltage $Y(\omega t)$.

It has been assumed that the voltages $a_j \cos j \omega t$ for example, in which $j$ assumes the values from zero to $n$, are in phase, so that the zeros of the first voltage ($j=1$) coincide with the zeros of the others. The parasitic phase shifts introduced by the various circuits such as the filters may falsify this assumption. To this end the phase shifters for the various harmonics of the fundamental are variable and are coupled together to produce harmonic voltages in phase with the fundamental. By means of phase comparison circuits of known type, the phase shifters $311_{jc}$ are coupled to the phase of the output voltage from phase shifter $311_{1c}$ and the phase shifters $311_{js}$ are coupled to the phase of the output voltage of phase shifter $312_{1s}$. A single one of these phase comparators 306 is shown in FIG. 20, subjecting the output voltage of phase shifter $311_{2c}$ to the same phase as that of the output voltage of phase shifter $311_{1c}$.

In order to extend the cycle of the function Y from the inadequate time $2\pi/\omega$ out to a suitable value, the said function is sampled by sampling pulses having a recurrence frequency which differs slightly from the frequency of Y and a phase $\psi$ which is slowly variable. The sampling pulse train is represented by expression:

$$\sum_{j=1}^{n} [\cos j\psi \cos j\omega t + \sin j\omega t] = \sum_{j=1}^{n} \cos j(\omega t - \psi)$$

where $\psi(t) = \psi t$, $\psi$ being small with respect to $\omega$. The expression for the sampling pulse train is a sum of cosines or arcs in arithmetical progression. It is known that this sum may be written $$\sum_{j=1}^{n} \cos j(\omega t - \psi) = \cos n \frac{\omega t - \psi}{2} \times \frac{\sin (n+1)\frac{\omega t - \psi}{2}}{\sin \frac{\omega t - \psi}{2}} - 1$$

(4)

This function is shown in FIG. 21. It comprises pulses 315 of high amplitude having a recurrence angular frequency of $(\omega - \psi)$ separated by pulses of minor amplitude.

The quantity (4) is obtained by means of a synthesizer 303 represented by the symbol of FIG. 12 receiving at shaft 304 a slow input rotation $\psi$ and energized with voltages representative of $\cos \omega t \ldots \cos n\omega t$ and $\sin \omega t \ldots \sin n\omega t$ which are derived from the outputs of phase-shifters $311_{1c}$ to $311_{nc}$ and $311_{1s}$ to $311_{ns}$ of synthesizer 300.

The sampling operation which, as well known, is a multiplication of the function to be sampled by the sampling pulses, is performed in multiplying circuit 305. Multiplying circuits suitable in A.C. analog computers are well known in the art. They are for example described at page 673 and illustrated in FIG. 19.9 of "Waveforms" by Chance, Hughes, McNichol, Sayre and Williams, McGraw-Hill Book Company, Inc., New York 1949.

The pulse modulated voltage issued from 305 is demodulated in a pulse demodulator which is symbolized in FIG. 20 by rectifier 314 and is used for controlling the Y co-ordinate drive of the machine.

If the parametric equations of the curve parallel to the profile are in polar rather than Cartesian coordinates (FIG. 11) the voltage representative of $X_0 \sin \alpha$ is developed in a simple sine potentiometer and the voltage representative of $\rho(\alpha)$ is developed in a harmonic synthesizer. It will hereinafter be assumed that the voltage representative of $X_0 \sin \alpha$ is available across resistor 93 and that the voltage representative of $\rho(\alpha)$ is available across resistor 98. The cutting tool carriage 59 is then positioned in terms of the coordinate $\rho$ just as it was in terms of the coordinate Y in the embodiment of FIG. 6, reference characteristics 59 and 70 to 75 having in FIG. 11 the same meaning as in FIG. 6.

Figure 11:
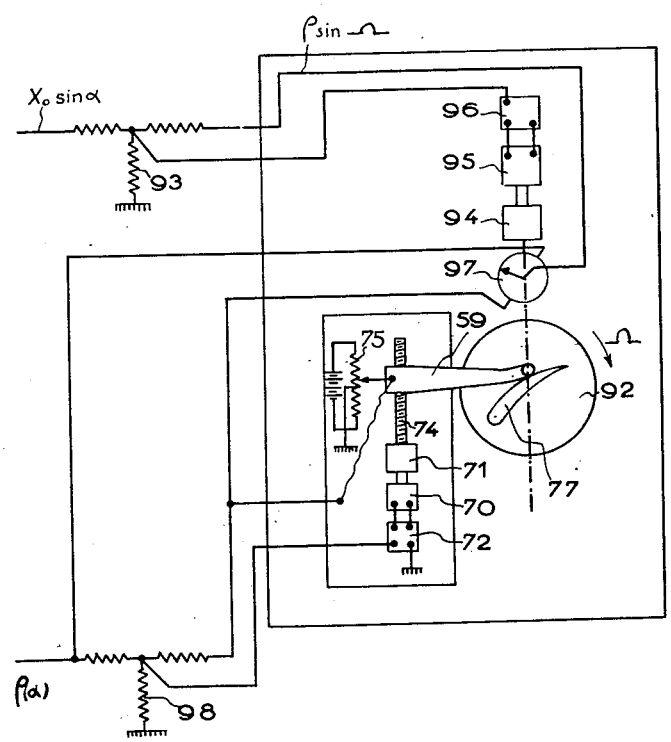
FIG. 11 is a schematic diagram of the servomechanism for positioning of the cutting tool when the curve parallel to the desired profile is defined in polar parametric coordinates.

The work piece table 92 in FIG. 11 is however mounted for rotation and is driven by a motor 95 through a speed reducer 94. The output shaft of the reducer drives not only the table 92 but also the slider of a sine potentiometer 97 whose winding is energized with the voltage representative of $\rho(\alpha)$. Thus it is possible to pick off from potentiometer 97 a voltage representative of the product $\rho \sin \Omega$ in which the $\Omega$ is the polar angle through which the table 92 is rotated. For the particular choice made for the perimeter $\alpha$ in the examples herein discussed this means:

$$\rho \sin \Omega = X_0 \sin \alpha$$

If consequently the voltages $\rho \sin \Omega$ and $X_0 \sin \alpha$ are compared in resistor 93 one obtains an error voltage which, suitably amplified in amplifier 96 drives the servomotor 95.

Figure 17:
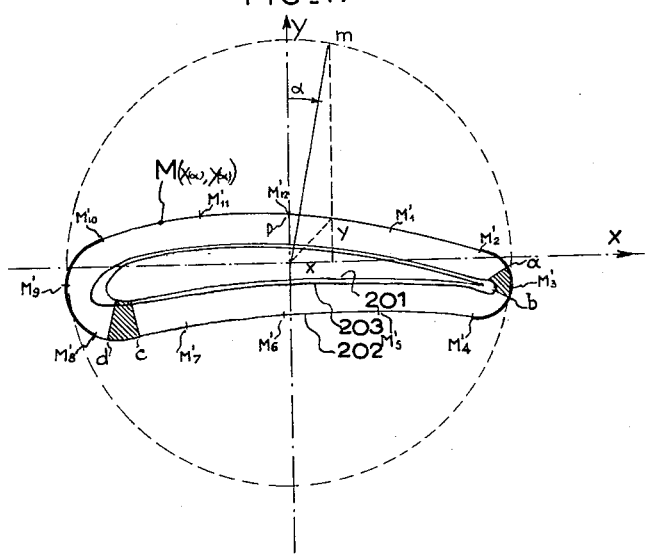
FIG. 17 is a diagram similar to FIG. 13 but illustrating a different distribution of the data points to be analyzed in order to reduce over certain zones of the profile to be cut the speed of response required of the servo or other machine tool driving elements.

A description will now be given of those features of the invention which make it possible to obtain a constant speed of advance for the cutting tool and a substantially constant flow of chips. Referring to FIGS. 13 and 17, the profile 201 to be machined is assumed for the purposes of a concrete example to be of the type of Joukowsky. 202 is the parallel curve to be followed by the axis of the cutting tool for example a rotating miller, and 203 is the outline, in the plane of the profile 201, of the casting to be machined, reinforced in the vicinity of the leading and trailing edges of the blade for reasons already described. Let $X(\alpha)$ and $Y(\alpha)$ represent generally the coordinates of a point M on the parallel curve 202 as functions of the angular parameter $\alpha$ and let $X(\gamma)$ and $Y(\gamma)$ be the coordinates of the same point as functions of an angular parameter $\gamma$ which is proportional to the curvilinear abscissa $s$ of M measured from a point P of zero abscissa and positive ordinate, this curvilinear abscissa itself being proportional to time as already explained. $\gamma$ and $s$ are related by $$\gamma = \frac{2\pi s}{S}$$

in which S is the total length of the curve 202. Finally let $y(\gamma)$ be the ordinate of $m$ as a function of the parameter $\gamma$. $X(\alpha)$ and $Y(\alpha)$ are as before defined by Equation 1. Similarly $X(\gamma)$, $Y(\gamma)$ and $y(\gamma)$ can be set in the form $$X(\gamma) = \sum_{j=0}^{n} e_j \cos j\gamma + \sum_{j=1}^{n-1} f_j \sin j\gamma$$

$$Y(\gamma) = \sum_{j=0}^{n} g_j \cos j\gamma + \sum_{j=1}^{n-1} h_j \sin j\gamma$$

$$y(\gamma) = \sum_{j=0}^{n} k_j \cos j\gamma + \sum_{j=1}^{n-1} l_j \sin j\gamma$$

For example, there will now be given the development in series of $X(\gamma)$ and of $Y(\gamma)$ for the case where the curve 202 is harmonically analyzed for twelve points $M_1$ to $M_{12}$ which divide it into twelve equal parts:

(5) $X(\gamma) = -2.12$
  $+4.10 \cos \gamma$      $+395.72 \sin \gamma$
  $-1.79 \cos 2\gamma$     $+0.21 \sin 2\gamma$
  $-2.16 \cos 3\gamma$     $-35.08 \sin 3\gamma$
  $+0.62 \cos 4\gamma$     $-0.64 \sin 4\gamma$
  $+1.06 \cos 5\gamma$     $+9.19 \sin 5\gamma$
  $+0.29 \cos 6\gamma$ (6) $Y(\gamma) = +16.91$
  $+149.96 \cos \gamma$    $-2.46 \sin \gamma$
  $+17.83 \cos 2\gamma$    $-9.38 \sin 2\gamma$
  $-30.83 \cos 3\gamma$    $+1.66 \sin 3\gamma$
  $+1.83 \cos 4\gamma$     $-1.01 \sin 4\gamma$
  $+7.36 \cos 5\gamma$     $+0.13 \sin 5\gamma$
  $-2.08 \cos 6\gamma$ The cutter will be uniformly translated along the parallel curve 202 if the angular parameter $\alpha$ is coupled to the angular parameter $\gamma$ instead of varying linearly with time and being represented by the uniform rotation of a shaft coupled to a constant speed motor. $\gamma$ itself is linear with time and is represented by the uniform rotation of a shaft, but $\gamma$ and $\alpha$ are related by the relation $$\alpha = \tan^{-1} \frac{X(\gamma)}{y(\gamma)} \quad (7)$$

In FIG. 14, 105 and 106 are two synthesizers of the type of FIG. 9 or FIG. 10. Both receive as inputs rotations from a shaft 104 whose angular position represents the parameter $\gamma$. The synthesizer 105 receives at its input voltage terminals voltages which are representative respectively of the coefficients $k_0, k_1 \ldots k_n$ and $l_1 \ldots l_{n-1}$ in the development of $y(\gamma)$, and its output voltage is proportional to $y(\gamma)$. The second synthesizer 106 receives on its input voltage terminals voltages which are respectively representative of the coefficients $e_0, e_1 \ldots e_n$ and $f_1 \ldots f_{n-1}$ of the development of $X(\gamma)$, and its output voltage is proportional to $X(\gamma)$.

The rotation $\alpha$ of a shaft 133 is however coupled to the rotation of shaft 104 in accordance with relation (7), in the following manner. 134 represents a motor and 135 a speed reducer whose output shaft 133 drives a sine potentiometer 136 whose two perpendicular sliders are connected to an adding network 137. This network also receives from synthesizers 105 and 106 voltages proportional to the quantities $X(\gamma)$ and $y(\gamma)$. The output signal from network 137 is a voltage on conductor 138 which is a linear function of the four quantities $X(\gamma)$, $y(\gamma)$, $\cos \alpha$ and $\sin \alpha$, and this voltage on conductor 138 goes to zero when the relation (7) is satisfied. The error voltage from network 137 is amplified in an amplifier 139 and as so amplified energizes the motor 134.

Shaft 133 provides a mechanical input to two further synthesizers 107 and 108, the first of which receives, as electrical inputs, voltages representative respectively of $c_0, c_1 \ldots c_n$ and of $d_1 \ldots d_{n-1}$. The second synthesizer 108 receives as electrical inputs voltages representative respectively of $a_0, a_1 \ldots a_n$ and of $b_1 \ldots b_{n-1}$. These two synthesizers respectively develop output voltages representative of $X(\alpha)$ and of $Y(\alpha)$. The output voltages from synthesizers 107 and 108 are applied respectively to subtraction networks 63 and 73 and the resulting error voltages are applied to the terminals 109 and 110 and 111 and 112 of the machine tool 76 of FIG. 6, terminals 109 and 110 being input terminals for the X drive and terminals 111 and 12 being those for the Y drive.

Correct operation of the servomechanisms for the X and Y drives of FIG. 6 comprising for the X drive amplifier 62, motor 60 and speed reducer 61 and for the Y drive amplifier 72, motor 70 and speed reducer 71 requires that the speed of variation of the corresponding Cartesian coordinate $X(\alpha)$ or $Y(\alpha)$ shall not exceed a specified value beyond which the error in machining will exceed a selected tolerance.

Speeds $X'(\gamma)$ and $Y'(\gamma)$ with which the coordinates $X(\gamma)$ and $Y(\gamma)$ vary are given by the following expressions which are derived respectively from relations (5) and (6) by reference to $\gamma$.

(8) $X'(\gamma) =$    $-4.1 \sin \gamma$       $+395.72 \cos \gamma$
       $+2.58 \sin 2\gamma$     $+0.42 \cos 2\gamma$
       $+6.48 \sin 3\gamma$     $-105.24 \cos 3\gamma$
       $-2.48 \sin 4\gamma$     $-2.56 \cos 4\gamma$
       $-5.30 \sin 5\gamma$     $+45.95 \cos 5\gamma$
       $-1.74 \sin 6\gamma$ (9) $Y'(\gamma) =$    $-149.96 \sin \gamma$    $-2.46 \cos \gamma$
       $-35.66 \sin 2\gamma$    $-18.76 \cos 2\gamma$
       $+92.49 \sin 3\gamma$    $+4.98 \cos 3\gamma$
       $-7.32 \sin 4\gamma$     $-4.04 \cos 4\gamma$
       $-36.80 \sin 5\gamma$    $+0.65 \cos 5\gamma$
       $+12.48 \sin 6\gamma$ The maximum permitted speed for the servos are indicated in FIGS. 15 and 16 by the horizontal lines of constant ordinate $v_{max}$. It is seen that the speed $X'(\gamma)$, represented in absolute value by the curve 214 in FIG. 15, is everywhere below the maximum permitted value whereas the speed $Y'(\gamma)$ which is represented in absolute value by the curve 205 in FIG. 16 exceeds the maximum permitted value by some 29% in the vicinity of a $\gamma$ value of 90° and by some 34% in the vicinity of a $\gamma$ value of 270°.

Reductions in speed of 29% must be epected over the segments $M_2$, $M_3$, $M_3$, $M_4$ on the parallel curve 202 and of 34% on the segments $M_8$, $M_9$, $M_9$, $M_{10}$. For simplification it is possible instead to provide a speed reduction of 40% over all four of these segments. This reduction in speed involves a reduction in the length of those segments. Let S be the entire length of the parallel curve 202, let $p$ be the total number of segments and let T be the time allotted for one complete pass of the cutting tool with respect to the workpiece. Let further $q$ be the percentage reduction in the speed and let $S_1$ be the reduced length of the four segments. The reduced speed of travel of the cutter center with respect to the workpiece over the four segments is $$v_1 = \frac{4S_1}{\frac{4}{p}T} = \frac{S_1}{T}p$$

The average speed over the remaining segments is $$v_2 = \frac{\frac{S-4S_1}{p-4}}{\frac{T}{p}} = \frac{S-4S_1}{T}\cdot\frac{p}{(p-4)}$$

setting $v_1$ equal to $(1-q)v_2$ one may read $$S_1 = \frac{(1-q)S}{p-4q}$$

In the example under consideration $q=0.4$ and $p=12$. This gives $S_1=0.057S$ whereas for a division of the contour 202 into twelve equal parts $S_1$ would be equal to 0.083S.

The function $Y'(\gamma)$ derived from the new analysis for the four reduced segments is represented by the curve 206 in FIG. 16. It exhibits the reduction in speed of the cutting tool with respect to the workpiece required for good operation of Y servo of FIG. 6. The new development of $\gamma Y'(\gamma)$ as a function of $\gamma$ is (9') $Y'(\gamma) =$
 $-140.99 \sin \gamma$    $-2.68 \cos \gamma$
 $-35.08 \sin 2\gamma$    $-13.42 \cos 2\gamma$
 $+44.75 \sin 3\gamma$    $+4.98 \cos 3\gamma$
 $+14.46 \sin 4\gamma$    $-20.48 \cos 4\gamma$
 $-2.05 \sin 5\gamma$     $+1.70 \cos 5\gamma$
 $+10.74 \sin 6\gamma$ and the new developments of the coordinates are as follows:

(10) $X(\gamma) =$
 $-1.79$
 $+3.25 \cos \gamma$      $+441.16 \sin \gamma$
 $-1.37 \cos 2\gamma$     $-1.37 \sin 2\gamma$
 $-0.91 \cos 3\gamma$     $-13.33 \sin 3\gamma$
 $+0.29 \cos 4\gamma$     $+1.08 \sin 4\gamma$
 $+0.66 \cos 5\gamma$     $+14.49 \sin 5\gamma$
 $-0.12 \cos 6\gamma$

(11) $Y(\gamma) =$
 $+14.87$
 $+140.99 \cos \gamma$    $-2.68 \sin \gamma$
 $+17.54 \cos 2\gamma$    $-6.71 \sin 2\gamma$
 $-14.91 \cos 3\gamma$    $+1.66 \sin 3\gamma$
 $+3.87 \cos 4\gamma$     $-5.12 \sin 4\gamma$
 $+0.41 \cos 5\gamma$     $+0.34 \sin 5\gamma$
 $-1.79 \cos 6\gamma$ FIG. 17 represents the new distribution of the analysis points $M'_1$ to $M'_{12}$ on the parallel curve 202 for which segments $M'_2$—$M'_3$, $M'_3$—$M'_4$, $M'_8$—$M'_9$ and $M'_9$—$M'_{10}$ have the reduced length $S_1$.

For the purpose of reducing undesired vibrations in the workpiece and machine, it is necessary to control the cutting speed, by which here is meant the speed of rotation of the cutter. To this end a preliminary cut or pass is made in order to obtain the data for a curve of cutter rotational speed as a function of the angle $\alpha$ (or the angle $\gamma$) which makes possible vibration-free machining. Such a curve is shown at 207 in FIG. 18. It is seen that the rotational speed of the cutter $\eta$ is everywhere close to a maximum speed $\eta_{max}$ (determined from the characteristics of the machine, workpiece, etc.) except in the vicinity of the points $\alpha=90°$ and $\alpha=270°$ which correspond to the hatched zones $ab$ and $cd$ in FIG. 17, where, to avoid vibrations it is necessary to reduce the rotational speed of the cutter.

Harmonic analysis of the curve 207 as divided into twelve intervals leads to the following limited Fourier series.

Figure 18:
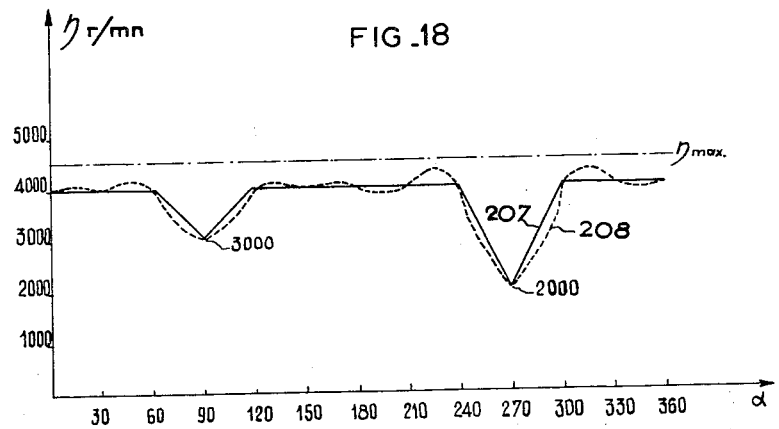
FIG. 18 is a curve giving as a function of the angular parameter the desired cutting speed (speed of rotation of the cutter) and the cutting speed actually obtained by means of the invention.

(12) $\eta(\alpha) = 3,750 + 500 \cos 2\alpha - 500 \cos 4\alpha + 250 \cos 6\alpha$
      $+ 166 \sin \alpha - 166 \sin 3\alpha + 166 \sin 5\alpha$ This development is plotted as the curve 208 of FIG. 18. It can be seen that it deviates only slightly from the curve 207 and that in particular it does not exceed the maximum permitted cutter rotational speed $\eta_{max}$.

A voltage proportional to $\eta$ is obtained in the synthesizer 142 which receives as mechanical input the rotation of shaft 133, which rotation represents $\alpha$. See FIG. 19. The coefficients in the Fourier development of $\eta$ are represented by the letters $\mu$ and $\nu$ with subscripts. The output of the synthesizer 142 is applied to a subtracting network 143 which receives in addition the voltage of a tachometer 144 coupled to the servomotor 145 which drives the cutter 146. The error voltage from network 143 is amplified in an amplifier 147 to energize the servomotor 145.

The synthesizers have a finite capacity which means that they are able to give the sum value of a Fourier series until up to and including a specified number of terms.

If the precision desired for the work piece requires the specification of a larger number of points along the curve parallel to the profile than that which corresponds to the capacity of the synthesizers, it is possible to record in a plurality of synthesizers the coefficients of the developments into Fourier series of limited sectors of the profile and to connect these synthesizers successively to the servomechanisms which operate the traversing drives of the machine tool.

FIG. 22 is a diagram of a profile to be machined. The profile is shown divided into 4 sectors identified as $a$, $b$, $c$ and $d$, and each of these sectors is specified in terms of 10 points, each of which is used to compute a limited Fourier development. A slight overlap is provided between adjacent sectors.

The Fourier series development corresponding to the 4 sectors are stored in a plurality of synthesizers $127_a$, $127_b$, $127_c$, and $127_d$ (FIG. 23) all driven by a shaft 128 rotating with $\alpha$. A plurality of relays $510_a$, $510_b$, $510_c$, and $510_d$ are energized sequentially by a switch 500 whose rotation on 501 is also driven by shaft 128. With switch arm 501 in contact with the terminal $a$ for example, relay $510_a$ is energized from source 502. A holding circuit is therefore established via its normally open contact $512_a$ and the normally closed contact $513_b$ on relay $510_b$. When the contact switch arm 501 contacts switch terminal $b$, relay $510_b$ is energized, opening at its contact $513_b$ the holding circuit for relay $510_a$. The synthesizer $127_a$ which during energization of relay $510_a$ was connected at contact $511_b$ with the circuit 54 or 55 of FIG. 11 is thereupon replaced in connection with circuits 54 or 55 by the synthesizer $127_b$.

While the invention has been described herein in terms of a number of preferred embodiments, numerous modifications and variations may be made therein without departing from the scope of the invention itself which is set forth in the appended claims.

I claim:

1. Apparatus for producing a continuously varying signal representative of one of the coordinates of a closed profile defined with reference to the parametric coordinates of a finite plurality $p$ of points along said profile, said apparatus comprising sine multiplying circuits having shafts and windings and being adapted to compute products of the voltages feeding said windings and the sine of the position angle of said shafts and products of said voltages and the cosine of said position angle, means for feeding said windings with voltages proportional to the $p$ values of one of said coordinate $Y_j$ ($j$ being an integer varying from 1 to $p$), means for stopping said shafts at angles equal to $j$ times the angular parameter $\alpha_i$ corresponding to a given coordinate $Y_i$ whereby the products $$Y_j \cos (j\alpha_i) \text{ and } Y_j \sin (j\alpha_i)$$

are obtained, means for adding respectively said sine products therebetween and said cosine products therebetween whereby quantities $$a_i = \sum_{j=1}^{p} Y_j \cos (j\alpha_i)$$

$$b_i = \sum_{j=1}^{p} Y_j \sin (j\alpha_i)$$

are obtained, said quantities being the coefficients of the terms out to the order $p/2$ of a Fourier series describing the values of said one coordinate along said curve as a function of said parameter, and a harmonic synthesizer adapted to develop from said coefficients and from a continuously varying signal representative of said parameter a signal representative of the value of said coordinate for a continuous range of values of said parameter.

2. Apparatus for producing continuously varying signals reprsentative of the coordinates of a closed profile defined by the values of the angular parametric coordinates of a finite plurality $p$ of discrete sample points on said profile, comprising sine multiplying circuits having shafts and windings and being adapted to compute products of the voltages feeding said windings and the sine of the position angle of said shafts and products of the said voltages and the cosine of said position angle, means for feeding said windings with voltages proportional to the $p$ values of the said coordinates $X_j$ and $Y_j$ ($j$ being an integer varying from 1 to $p$), means for stopping said shafts at angles equal to $j$ times the angular parameter $\alpha_i$ corresponding to given coordinates $X_i$, $Y_i$ whereby the products $$X_j \cos (j\alpha_i), X_j \sin (j\alpha_i), Y_j \cos (j\alpha_i) \text{ and } Y_j \sin (j\alpha_i)$$

are obtained, means for adding respectively the sine products relative to the coordinate $X_j$, the cosine products relative to the coordinate $X_j$, the sine products relative to the coordinate $Y_j$ and the cosine products relative to the coordinate $Y_j$ whereby quantities $$a_i = \sum_{j=1}^{p} Y_j \cos (j\alpha_i) \qquad b_i = \sum_{j=1}^{p} Y_j \sin (j\alpha_i)$$

$$c_i = \sum_{j=1}^{p} X_j \cos (j\alpha_i) \qquad d_i = \sum_{j=1}^{p} X_j \sin (j\alpha_i)$$

are obtained, said quantities being the coefficients of the terms out to the order $p/2$ of two Fourier series describing the values of said coordinates along said profile as a function of a continuously varying parameter and means for developing from said coefficients and from said continuously varying parameter the values of said coordinates as functions continuously varying with said parameter.

3. Apparatus for producing continuously varying signals representative of the coordinates of a closed profile defined by the coefficients of two limited number coefficient Fourier series representative each of one of the coordinates of said profile as a function of a cyclically varying parameter, comprising means for generating first voltages representative of the values of said coordinates periodically varying at a first unsuitable frequency means to generate a voltage cyclical at a lower frequency equal to said first frequency diminished by a frequency small compared to said first frequency, and means to multiply said first voltages separately by said voltage of lower frequency.

4. Apparatus for producing continuously varying signals representative of the coordinates X and Y of a closed profile known in terms of the coefficients of limited term Fourier series of said coordinates X and Y of the profile as functions of a cyclically varying parameter $\alpha$ representative of the polar angle of a point on a circle circumscribing and tangent to said profile, said apparatus comprising two first synthesizers adapted each to generate as a continuous variable a voltage representative of one of said coordinates from the coefficients of one of said series and from a rotation representative of $\alpha$, and means to generate for said first two synthesizers an input rotation $\alpha$ varying with time according to the relation $$\alpha = \tan^{-1} \frac{x(\gamma)}{y(\gamma)}$$

wherein $\gamma$ is a cyclical angle varying linearly with time which is proportional to the curvilinear abscissa of said profile, wherein $y(\gamma)$ is, expressed as a function of $\gamma$, the coordinate parallel to the profile coordinate Y of the point on said circle having parallel to the profile coordinate X the same value of X coordinate, and wherein $X(\gamma)$ is the profile coordinate X expressed as a function of $\gamma$, said last-named means comprising two second synthesizers both receiving an input rotation representative of $\gamma$, one receiving as inputs voltages representative of Fourier series coefficients of $X(\gamma)$ and the other receiving as inputs voltages representative of Fourier series coefficients of $y(\gamma)$, a servomechanism coupled to the rotation input to said first two synthesizers, and means to drive said servomechanism with a signal representative of the output of said second two synthesizers plus voltages related as the sine and cosine of said first two synthesizers' input rotation.

5. Apparatus for producing continuously varying signals representative of the abscissa and ordinate of a running point on a closed aerodynamic profile defined by the abscissae and the ordinates of a finite plurality of points on said profile and the corresponding values of an angular parameter representative, for each point of said plurality, of the polar angle of a corresponding point on a circle circumscribing said profile and tangent to two parallel straight lines tangent to the profile near the leading and trailing edges of the same, said corresponding point on said circle having the same abscissas as the point of said profile, comprising an abscissa sine multiplying circuit having a rotative shaft and a winding and being adapted to compute the product of the voltage feeding said winding and the sine of the position angle of said shaft, means for feeding said winding with a voltage proportional to the radius of said circle, means for positioning said shaft at an angle equal to the angular parameter of the running point on said profile whereby said first multiplying circuit produces a signal representative of the abscissa of the running point on said profile when said shaft rotates, ordinate sine multiplying circuits having shafts and windings and being adapted to compute products of the voltages feeding said windings and the sine of the position angle of said shafts and products of said voltages and the cosine of said position angle, means for feeding said windings with voltages proportional to the values of the ordinate $Y_j$ ($j$ being an integer varying from 1 to $p$), means for stopping said shafts at angles equal to $j$ times the angular parameter $\alpha_i$ corresponding to a given ordinate $Y_i$ whereby the products $$Y_j \cos (j\alpha_i) \text{ and } Y_j \sin (j\alpha_i)$$

are obtained, means for adding respectively said sine products therebetween and said cosine products therebetween whereby quantities $$a_i = \sum_{j=1}^{p} Y_j \cos(j\alpha_i); b_i = \sum_{j=1}^{p} Y_j \sin(j\alpha_i)$$

are obtained, said quantities constituting coexisting signals representative of the coefficients of a finite number of terms in a Fourier series for the ordinate as a function of the parameter and harmonic synthesizer means adapted to develop, from said coexisting signals and parameter, a continuously varying signal representative of the ordinate of the running point.

References Cited in the file of this patent
UNITED STATES PATENTS

| | | |
|---|---|---|
| 2,283,240 | Trinkle | May 19, 1942 |
| 2,497,042 | Doll | Feb. 7, 1950 |
| 2,628,539 | Neergaard | Feb. 17, 1953 |
| 2,656,101 | Haviland | Oct. 20, 1953 |
| 2,660,700 | Gates | Nov. 24, 1953 |